Jan. 26, 1960 L. H. MORIN 2,922,192
APPARATUS FOR APPLYING LABELS TO MOULDED SPOOL BODIES
Filed July 8, 1954 2 Sheets-Sheet 1
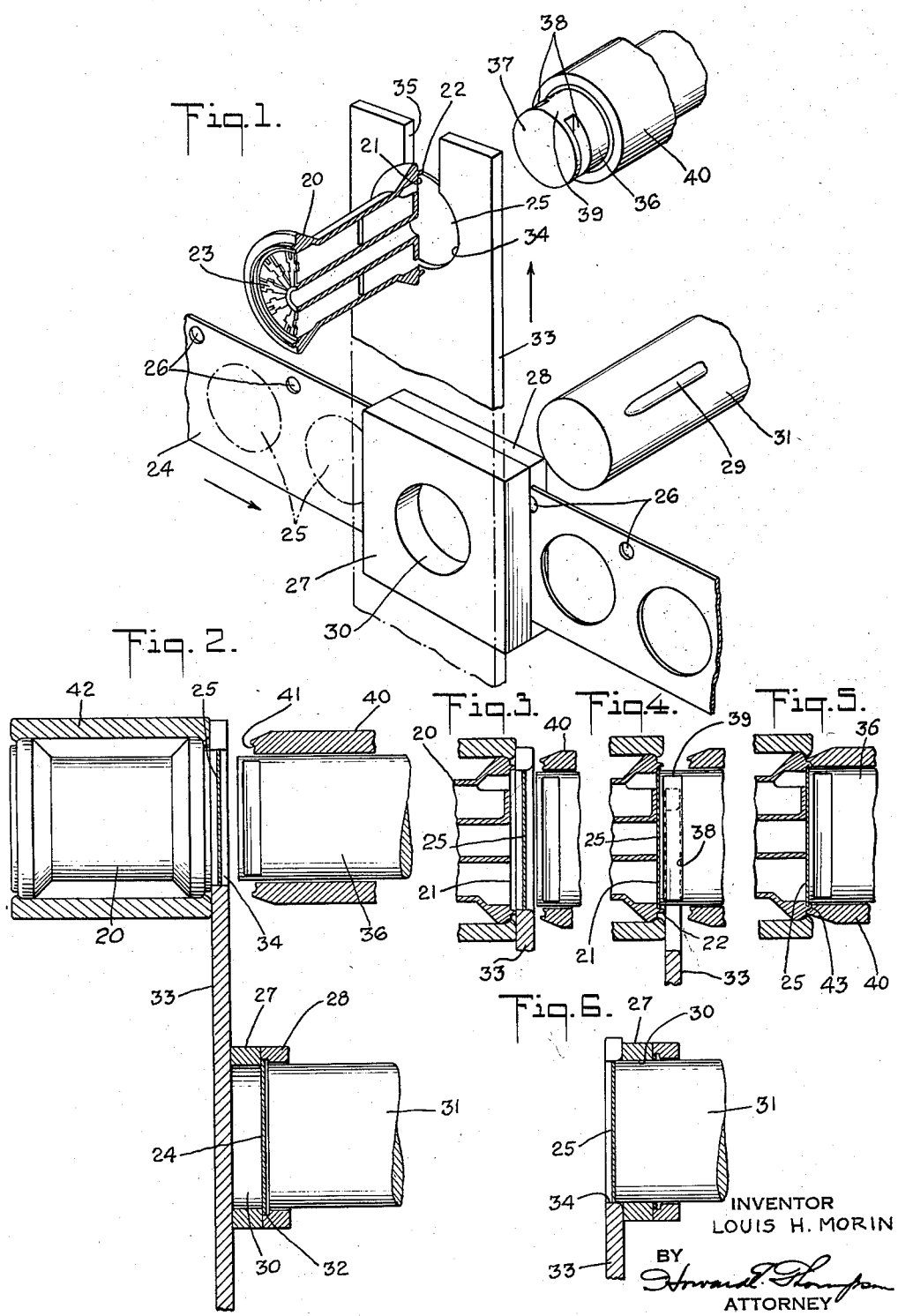
INVENTOR
LOUIS H. MORIN
BY
ATTORNEY Jan. 26, 1960 L. H. MORIN 2,922,192
APPARATUS FOR APPLYING LABELS TO MOULDED SPOOL BODIES
Filed July 8, 1954 2 Sheets-Sheet 2
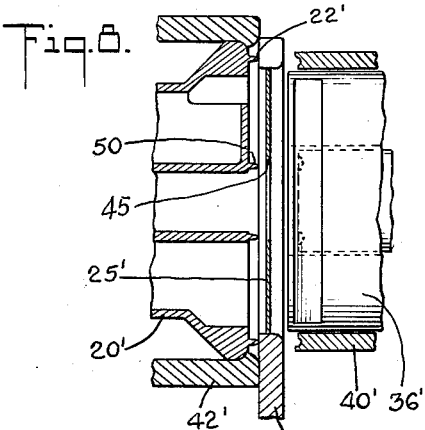
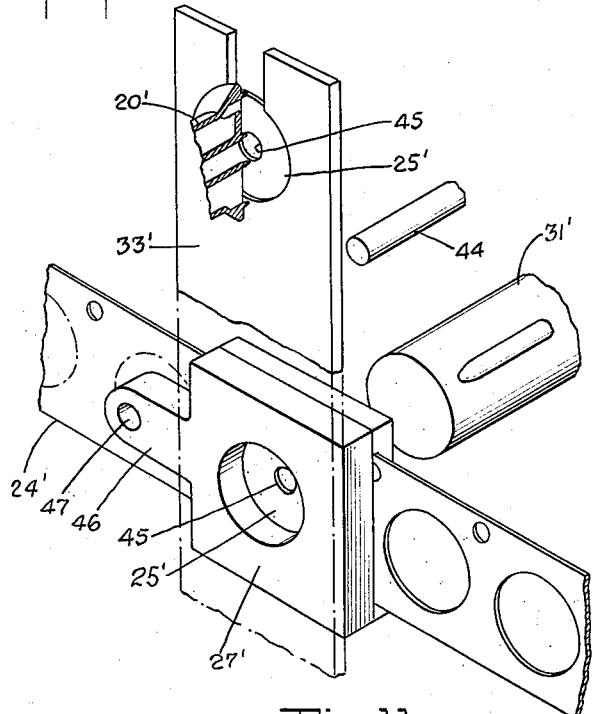
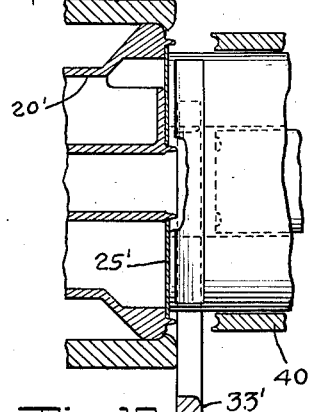
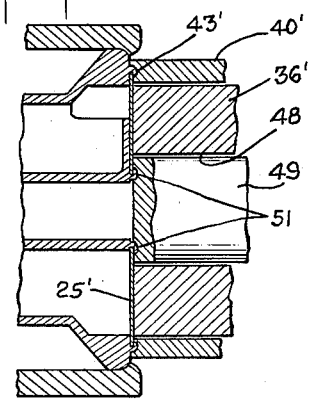
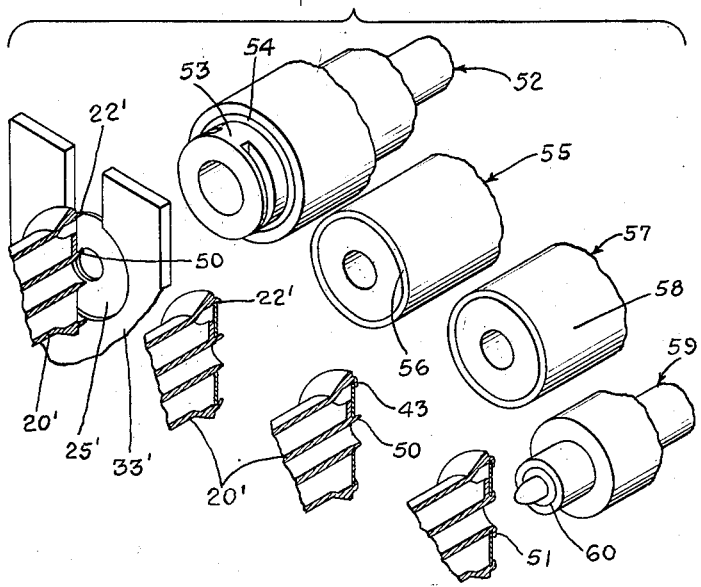
INVENTOR
LOUIS H. MORIN
BY
ATTORNEY

United States Patent Office 2,922,192
Patented Jan. 26, 1960

2,922,192

APPARATUS FOR APPLYING LABELS TO MOULDED SPOOL BODIES

Louis H. Morin, Bronx, N.Y., assignor to Coats & Clark, Inc., New York, N.Y., a corporation of Delaware Application July 8, 1954, Serial No. 442,138

12 Claims. (Cl. 18—19)

This invention relates to moulded plastic spool bodies and, more particularly, to the application of labels to the ends of spool bodies and securing the labels in position thereon. Still more particularly, the invention deals with an apparatus, wherein labels are fashioned from a label strip or sheet and then delivered to a position registering with a spool end, then moved into and held upon the spool end during the operation of shaping integral portions of the spool end into position on the spool end.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic perspective view illustrating the apparatus for cutting a label from a label strip and delivering the same to position in alinement with the end of a moulded plastic spool.

Fig. 2 is a diagrammatic vertical sectional view through the structure shown in Fig. 1 illustrating a spool and label in alined position with each other, the spool being shown in elevation.

Figs. 3, 4 and 5 are views, similar to Fig. 2, illustrating only parts of the construction with the spool shown in section and indicating the successive steps in moving the label into position on the spool end and shaping the spool end to secure the label in position on the spool.

Fig. 6 is a view, similar to Fig. 2, showing only a part of the construction and with parts in a different position.

Fig. 7 is a view, similar to Fig. 1, omitting part of the construction and showing a modification.

Figs. 8, 9 and 10 are views, similar to Figs. 3, 4 and 5, illustrating the apparatus for attaching a ring-type label to a spool end; and Fig. 11 is an exploded diagrammatic perspective view illustrating parts of a spool in section and showing a modified apparatus for securing a label in position through a series of successive forming or curling operations.

In Figs. 1 to 6, inclusive, I have diagrammatically illustrated one type of apparatus for forming and applying a label to a spool end. At this time, it is also well to point out that, in this structure, as well as in others shown, I will deal solely with the attachment of a label to one end of the spool, it being understood that duplicate mechanisms are employed for simultaneously performing the same operations at the other end of the spool. In order to simplify the illustration of the invention, the duplications have been obviated.

In Figs. 1 to 5, inclusive, 20 represents a moulded plastic spool, which can be of any form and construction, the spool having a recessed end 21, upon which a label is to be placed and secured, as later described. In the structure shown in said figures, the recess is defined by an outwardly projecting annular flange 22 forming means adapted to engage a label. It will be apparent that the showing of the spool 20 is diagrammatic and is of hollow construction, the spool ends having radial ribs 23, as noted at the left of Fig. 1, which form supporting surfaces for the label.

At 24 is shown an elongated label strip, from which labels 25 are cut, the strip 24 having spaced centering apertures 26 for positioning the label portions within a pair of blocks 27, 28, the label being guided in this positioning by an alinement pin 29 adapted to enter one of the apertures 26.

The block 27 has a bore 30, which forms the die controlling the size and shape of the label fashioned from the strip 24 by advancement of a punch 31 through the aperture 30, as clearly noted in Fig. 6 of the drawing.

The block 28 is recessed, as seen at 32, to support the full width of the strip 24 and to position said strip adjacent the surface of the die block 27.

At 33 is shown a transfer slide arranged upon the outer surface of the block 27, as clearly shown in Fig. 2 of the drawing. The end portion of the slide 33 has an aperture 34 of a diameter to snugly receive the label 25, the aperture 34 having a slot 35 opening through the end of the slide, as is clearly noted in Fig. 1 of the drawing. The slide 33 moves from a position shown in Fig. 6 of the drawing, in other words, in alinement with the block 27, to the position shown in Figs. 1 and 2, in which latter position the label 25 is positioned in alinement with the recess 21 of the spool 20, as is clearly noted in Fig. 3 of the drawing.

At 36 is shown a label advancing and holding plunger having a flat disc end 37, adjacent which are recessed sides 38, note Fig. 1, the recessed sides forming a bar portion 39. This bar portion 39 is free to pass through the recess 35 of the slide 33 in movement of the slide from the position shown in Fig. 3 back to the position of Fig. 6 and a partial stage of this operation is indicated in Fig. 4 of the drawing.

Arranged upon and movable longitudinally of the plunger 36 is an electrically heated forming or curling tool 40, the end 41 of which, note Fig. 2 of the drawing, is so fashioned as to curl the protruding flange 22 onto the spool end in the manner diagrammatically shown in Fig. 5 of the drawing in securing the label 25 in position thereon.

Considering now the stages of operation, as diagrammatically illustrated in Figs. 2 to 6, inclusive, and keeping in mind that a suitable support or track 42 is provided for the spool, as diagrammatically seen in Figs. 2 to 5, inclusive, a label 25 is first cut from the label strip 24. This is accomplished by advancing the punch 31 from the position shown in Fig. 2 to the position shown in Fig. 6, with the aperture 34 of the slide 33 in proper registering position with the block 27. The label 25 is fed into the central portion of the aperture 34, whereupon the punch 31 is retracted; the slide 33 is then moved upwardly into the position shown in Figs. 2 and 3, after which the plunger 36 is advanced and the label 25 is then moved from a position within the aperture 34 into the recess 21 of the spool end, as clearly noted in Fig. 4 of the drawing, whereupon, the slide 33 is then moved downwardly, as partially indicated in Fig. 4. Thereafter, the curling tool 40 is advanced to curl over the flange 22 in the manner indicated in Fig. 5 of the drawing to form a label retaining portion 43. This securely engages the peripheral edge of the label 25. It will be understood that, in the curling operation, the heated tool 40 softens the flange 22 sufficiently to perform the curling or shaping operation described.

This latter operation is shown and described in more detail in a companion application, Serial Number 442,137, filed July 8, 1954.

After the label 25 has been secured in position, the plunger 36 and tool 40 are withdrawn from the surface of the spool, after which another spool is brought into label receiving position and the above cycle of operation is repeated.

In Figs. 7 to 10, inclusive, I have shown a slight modification of the apparatus and method, as disclosed in Figs. 1 to 6, inclusive, for forming and applying a ring-type label 25' to the end of a spool 20'. The label 25' is formed from a label strip 24', generally similar to the strip 24, but, in addition to the punch 31', another small punch 44 is employed to form an aperture 45 centrally of the label; converting the label into ring formation, as will be apparent. Thus the structure of the block 27' is modified to provide an extension 46 thereon with a die aperture 47 in the extension, the diameter of which conforms with that of the punch 44 and controls the formation of the aperture 45.

In Figs. 7 to 10, inclusive, 33' represents a slide, similar to the slide 33, for delivering the label 25' into position in alinement with the spool 20', as clearly noted in Figs. 7 and 8. At 36' is a plunger, generally similar to the plunger 36, differing from the plunger 36 in having a bore 48, in which a center curling or forming tool 49 operates. At 40' is shown a curling or forming tool, similar to the tool 40. The spool 20', in addition to having the annular flange 22', similar to the flange 22, has an inner smaller diameter annular flange 50, which is adapted to be curled or formed by the tool 49 in forming thereof an annular label engaging or retaining portion 51, as noted in Fig. 10 of the drawing, the label retaining portion 43' also being formed. The inner flange 50 is curled outwardly to engage the inner diameter of the ring label 25'; whereas the outer flange is turned inwardly, as will be apparent. At 42' I have shown a support or track for the spool 20', similar to the support 42. It will be understood that these supports 42, 42' are jaw-like supports, which open and close in engaging and positioning tools for reception of the labels.

No further detailed description of the operation of the apparatus shown in Figs. 7 to 10 is necessary, except in stating that the punch 44 advances simultaneously with the punch 31' so that the aperture 45 is formed in the strip 24' before the label portion of the strip is in position in alinement with the block 27'. Further, it will be apparent that the forming tool 49 is advanced with the tool 40' so as to simultaneously curl the inner flange in the operation of curling the outer flange of the spool.

In Fig. 11 of the drawing, I have diagrammatically shown another apparatus, which differs from the apparatus shown in Figs. 1 to 10, inclusive, for performing the several curling operations in a series of stages. In Fig. 11, 20' represents a spool, similar to the spool 20' shown in Figs. 7 to 10, inclusive. At 25' is shown a similar type of label which is positioned in alinement with the spool 20' by a slide 33', similar to the slide 33' of said other figures. 52 designates one station or position of the labeling operation and at 53 is a plunger for advancing the label 25' into position upon the spool end between the flange 22' and the flange 50 and at 54 is shown a curling tool which can slightly curl the flange 22' to retain the label against displacement from the spool end. The spool 20' is then moved to a second position or station 55 employing a curling tool 56 to further curl the flange 22' in the manner diagrammatically seen at said station.

Then the spool can be advanced to another station 57 having another curling tool 58 for finally curling or setting the flange 22' to produce the label retaining portion 43', similar to that noted in Fig. 10 of the drawing. After performing this operation, the spool is then moved to another station 59, including a curling tool 60 for curling the inner flange 50 in forming the retaining portion 51, as also noted in Fig. 10 of the drawing. In other words, instead of producing both curling or forming operations upon the flanges 22', 50 simultaneously in the manner shown in Fig. 10, these operations can be performed at a series of successive forming operations, as described. This type of construction would be desirable with some types of spools, particularly where it would be desirable to obviate excessive heat flow which might distort the spool structure. In all instances, heated curling or forming tools will be employed.

For purposes of description, the blocks 27 and 28, in conjunction with the punch 31, may be said to comprise a label forming station, the slide 33 means for conveying or delivering the formed label from the forming station to the applying or curling station, at which latter station is disposed the plunger 36 and the curling tool 40. While this descriptive terminology is applied to the structure shown in Figs. 1 to 6, inclusive, it is also applicable to the structure shown in the other figures, Fig. 11 being further modified to the extent of including the series of forming or curling stations for performing the curling operation. Still further, the apparatus can be utilized in attaching or securing labels or members to any type or kind of workpiece in the form of a plastic body.

Other advantages of the stepped operation of the apparatus for forming, as disclosed in Fig. 11 of the drawing, are that an operation of this kind will result in speeding up production of the labeled spools and further provide a more definite control in the heating operations. Thermostatic controls are provided so that the heat applied to the flange or label retaining means can be controlled at the different stages to avoid excessive heating which might injure the plastics. Further, heating of the curling tool 60 can be controlled at a lower temperature by reason of the fact that a lesser amount of plastic material requires heating than to heat the larger diameter outer flange 22'. The temperature controls are also desirable with different types of plastic materials employed.

In conclusion, it may be seen that the invention is directed to the continuous production of spools having end labels attached to them. The operation of the apparatus comprises forming labels from a continuous strip, positioning each label on an end face of a spool, and moving peripheral portions of the end face over onto peripheral portions of the label. Preferably the movable or deformable peripheral portions of the end face are in the form of the retaining flange means above described, and as further set forth in the said copending application, including continuous and discontinuous flanges. The flange or flanges are made workable preferably by applying heat to them during the operation of moving or bending them over onto peripheral portions of the label, although some materials may lend themselves to this step without use of heat. Thermoplastic materials are preferred, but other deformable material such as metal is suitable. If desired, the forming tool may be rotated during application to the retaining flanges but usually is not, and as noted, the tool may be applied in successive stages, the latter technique being applicable to the inner as well as to the outer flange. It may be noted that an air space is maintained between the heated forming tools and the plungers 36, 36', and 53 to prevent the latter from becoming undesirably heated. It is convenient to print the labels in strip form, and any suitable means can be used for moving the strip. Each formed label is held in the aperture 34 of slide 33 by friction. More than one spool can be processed at a time, and the spools may or may not be threaded at the time of processing. The spools may be entirely or partially made of plastic and may be formed integrally or from two or more pieces. A spool partially made of plastic comprises one whose rims or peripheral flange portions are of plastic, and in such case retaining flange means may be formed on the peripheral portions of the end face of the spool if such peripheral portions are not adapted to be moved, at least in part, over onto peripheral portions of the label.

Spools having labels attached as described present an attractive appearance. The retaining flange means protects the label against scuffing and upturning of the edges. The apertured label of Figs. 7–11, with its inner and outer flanged boundaries, helps to improve the appearance of the spool, while the non-apertured label of Figs. 1–6 provides additional printing space. The spools are specially suitable for domestic use, their plastic rims enabling them to be provided with a chip-resistant nick.

Having fully described my invention, what I claim as new and desire to secure by Letters Patent is:

1. An apparatus for applying labels to end faces of moulded plastic spools, having label supporting means at said end faces, said apparatus comprising a pair of apertured blocks, between which a label strip is intermittently fed, a punch movable through said blocks in removing a label from said strip, a slide engaging the surface of one of said blocks and movable relatively to said surface, said slide having an aperture registering with the aperture of said block and adapted to receive a label cut from the strip and delivered to the slide aperture by said punch, said slide being movable into position registering the label supported thereby with the end face of a supported plastic spool, a plunger for moving the label from the aperture of said slide into engagement with the end face of the supported spool within said label supporting means and for holding the label on said end face, said slide being then moved out of engagement with said supported spool, and a forming tool movable longitudinally of said plunger and adapted to operatively engage the label supporting means on the end face of the spool in shaping said means into engagement with the label to secure the label against displacement from the end face of the spool.

2. An apparatus for applying labels to end faces of moulded plastic spools, having label supporting means at said end faces, said apparatus comprising a pair of apertured blocks, between which a label strip is intermittently fed, a punch movable through said blocks in removing a label from said strip, a slide engaging the surface of one of said blocks and movable relatively to said surface, said slide having an aperture registering with the aperture of said block and adapted to receive a label cut from the strip and delivered to the slide aperture by said punch, said slide being movable into position registering the label supported thereby with the end face of a supported plastic spool, a plunger for moving the label from the aperture of said slide into engagement with the end face of the supported spool within said label supporting means and for holding the label on said end face, said slide being then moved out of engagement with said supported spool, and means comprising a series of forming tools for operatively engaging the label supporting means of the spool in shaping said means into position to secure the label against displacement from the spool.

3. Apparatus of claim 1 wherein the label supporting means of the spool comprises an annular flange, and wherein said forming tool engages said flange to curl the same onto said label.

4. Apparatus of claim 2 wherein said spool has a second label supporting means engageable with a central aperture in the label, and wherein one of said forming tools is engageable with said second label supporting means to shape the same into label securing position.

5. Apparatus for attaching end ticket labels on thread spools wherein each spool has a throughbore opening in each end face, an annular bendable flange extending outwardly from said end face and disposed adjacent the periphery of the rim of the spool, said flange enclosing a label-receiving area on said end face, which comprises: a feed and die block disposed at a label forming station and having an aperture therethrough defining the size of a circular label, said block having a recess disposed transversely of said aperture and of a width greater than the diameter of said label, said recess being adapted to pass a successively printed strip; a punch on one side of said block supported for intermittent movement toward and from said block and having an end face whose cross-sectional size is equal to that of said label; a movably supported slide in contact with the other side of the block and having a label-receiving recess, said slide being disposable at said label forming station so that the recess thereof is alined with said block aperture and being intermittently movable between said label forming station and a label applying station to dispose said recess at each of said stations; said punch being movable into said block aperture to cut a printed portion from said strip, thereby forming a label, and to move said label through said aperture into the alined label-receiving recess of said slide; a plunger movably supported for to and fro movement at said label applying station, a tubular member concentrically disposed around but spaced from said plunger and indpendently movable longitudinally thereof, said member having a concaved annular recess in the forward edge thereof; said plunger being movable into said slide recess at the label-applying station to engage the label therein and to move said label out of the recess into said flange-enclosed label-receiving area of said spool and in contact with said spool end face, cooperating means on said slide and plunger to permit the slide to be moved past said plunger, said slide being retractable to the label forming station to permit a succeeding label to be received in the recess thereof and to permit said tubular member to move toward said spool end face, the concaved annular recess of said edge of said member being engageable with the annular flange of the spool, thereby to bend said flange over onto peripheral portions of the label.

6. Apparatus for attaching end ticket labels on thread spools wherein each spool has a throughbore opening in each end face, an annular, plastic, heat-workable flange extending outwardly from said end face and disposed adjacent the periphery of the rim of said spool, said flange enclosing a label-receiving area on said end face, which comprises: means disposed at a label forming station and having an aperture therethrough defining the size of a circular label, said means having a recess disposed transversely of said aperture of a width greater than the diameter of said label and adapted to pass a successively printed strip; a punch on one side of said means supported for intermittent movement toward and from said means and having an end face whose cross-sectional size is equal to that of said label; a movably supported slide on the other side of said means having a label-receiving recess, said slide being disposable at said label forming station so that the recess thereof is alined with said aperture in said means and being intermittently movable between said label forming station and a label applying station to dispose said recess at each of said stations; said punch being movable into said aperture of said means to cut a printed portion from said strip, thereby forming a label, and to move said label through said aperture into the alined label-receiving recess of said slide; a plunger movably supported for to and fro movement at said label applying station, a heatable tubular member concentrically disposed around but spaced from said plunger and independently movable longitudinally thereof; said plunger being movable into said slide recess at the label-applying station to engage the label therein and to move said label out of the recess into said flange-enclosed label-receiving area of the spool and in contact with said spool end face, said slide being retractable to the label forming station to permit a succeeding label to be received in the recess thereof and to permit said tubular member to move toward said spool end face, said member being engageable with the annular plastic flange of the spool, thereby to heat and bend said flange over onto peripheral portions of the label.

7. Apparatus for attaching end ticket labels on thread spools for household use having plastic rims, wherein each spool has a throughbore opening in each end face, an annular, plastic, heat-workable flange extending outwardly from said end face and disposed adjacent the periphery of said rim, said flange enclosing a label-receiving area on said end face, which comprises: a die block disposed at a label forming station and having an aperture therein defining the size of a circular label, an apertured strip feeding block in contact with one side of the die block such that the apertures of said blocks are alined, a recess in said feeding block disposed transversely of said alined apertures and of a width greater than the diameter of said label for passing a successively apertured, successively printed strip; a punch supported for intermittent movement toward and from said blocks and having a cross-sectional size equal to that of the aperture in said die block, an alining pin supported for to and fro intermittent movement relatively to said blocks and successively engageable with the apertures in said strip; a movably supported slide in contact with the other side of the die block and having a label-receiving recess of a diameter smaller than the label so as to provide a friction fit for the label, a slot in said slide extending into said recess, said slide being disposable at said label forming station so that the recess thereof is alined with said alined block apertures and being intermittently movable between said label forming station and a label applying station to dispose said recess at each of said stations; said pin being movable through a strip aperture to aline a printed portion of the strip with the aperture in said die block, said punch being movable into said alined block apertures to cut said alined printed portion from said strip, thereby forming a label, and to move said label through said alined apertures into the alined label-receiving recess of said slide a plurality of relatively movable spool supports at said last station adapted to hold said spool with the end face thereof in alinement with said slide recess, a plunger movably supported for to and fro movement at said label applying station, a flat end on the plunger of a diameter smaller than that of the slide recess, said plunger inwardly of said end having a bar portion of a thickness less than the width of said slide slot, a heatable tubular member concentrically disposed around but spaced from said plunger and independently movable longitudinally thereof, said member having a concaved annular recess in the forward edge thereof; said plunger being movable into said slide recess to engage the label therein on said flat end of the plunger and to move said label out of the recess into said flange-enclosed label-receiving area of the spool and in contact with said spool end face, the bar portion of the plunger being extendable through said slide recess to a point in alinement with said slide slot, said slide being retractable to the label forming station to permit said tubular member to move toward said spool end face, the concaved annular recess of said edge of said member being engageable with the annular plastic flange of the spool, thereby to heat and bend said flange over onto peripheral portions of the label and to receive a succeeding spool.

8. Apparatus of claim 5 for attaching end ticket labels on thread spools of the kind described in claim 5 but wherein each spool has a second annular bendable flange on said end face concentric with but of smaller diameter than said first flange, said label-receiving area being disposed between said first and second flanges, and wherein: said block at the label forming station has an apertured extension the aperture of which extends parallel to said block aperture and transversely of said block recess; a second punch on said one side of the block laterally spaced from and of smaller diameter than the first punch and movable therewith, said second punch being movable into said extension aperture to cut a central hole in a preceding printed portion of said strip coincidently with the movement of the first punch in cutting a printed portion from the strip to form a label, said cut label having a central hole engageable by said second spool flange at said label applying station to thereby aline the hole with the throughbore opening in the end face of the spool; said plunger at said label applying station having a second tubular member concentrically disposed therein but spaced therefrom and independently movable longitudinally thereof, said second member being movable with the first member and having a concaved annular recess in the forward edge thereof; said first and second members being movable toward said spool end face to respectively engage the first and second flanges in the concaved annular recesses thereof, thereby to bend said flanges over onto outer and inner peripheral portions of the label.

9. Apparatus of claim 6 for attaching end ticket labels on thread spools of the kind described in claim 6 but wherein each spool has a second annular, plastic heat-workable flange on said end face concentric with but of smaller diameter than said first flange, said label-receiving area being disposed between said first and second flanges, and wherein: said means at the label forming station has an apertured extension the aperture of which extends parallel to said means aperture and transversely of said means recess; a second punch on said one side of said means laterally spaced from and of smaller diameter than the first punch and movable therewith, said second punch being movable into said extension aperture to cut a central hole in a preceding printed portion of said strip coincidently with the movement of the first punch in cutting a printed portion from the strip to form a label, said cut label having a central hole engageable by said second spool flange at said label applying station to thereby aline the hole with the throughbore opening in the end face of the spool; said plunger at said label applying station having a second heatable tubular member concentrically disposed therein but spaced therefrom and independently movable longitudinally thereof; said first and second members being movable toward said spool end face to respectively engage the first and second flanges, thereby to heat and bend said flanges over onto outer and inner peripheral portions of the label.

10. Apparatus of claim 6 for attaching end ticket labels on thread spools of the kind described in claim 6 but wherein each spool has a second annular, plastic heat-workable flange on said end face concentric with but of smaller diameter than said first flange, said label-receiving area being disposed between said first and second flanges, and wherein: said means at the label forming station has an apertured extension the aperture of which extends parallel to said means aperture and transversely of said means recess; a second punch on said one side of said means laterally spaced from and of smaller diameter than the first punch and movable therewith, said second punch being movable into said extension aperture to cut a central hole in a preceding printed portion of said strip coincidently with the movement of the first punch in cutting a printed portion from the strip to form a label, said cut label having a central hole engageable by said second spool flange at said label applying station to thereby aline the hole with the throughbore opening in the end face of the spool; a plurality of independently movable, heatable tubular members disposed laterally of one another and laterally of said first tubular member at said label applying station; means for moving and alining said spool with each of said members; each said member being separately movable to individually engage said spool, a first group of said members being successively engageable with said first spool flange to bend the same over onto outer peripheral portions of the label in a plurality of stages, and at least a final member being engageable with said second spool flange to bend the same over onto inner peripheral portions of the label.

11. Apparatus for attaching end ticket labels on thread spools wherein each spool has a throughbore opening in each end face, an annular bendable flange extending outwardly from said end face and disposed adjacent the periphery of the rim of the spool, said flange enclosing a label-receiving area on said end face, which comprises: a feed and die block disposed at a label forming station and having an aperture therethrough defining the size of a circular label, a recess in said block disposed transversely of said aperture and of a width greater than the diameter of said label, said recess being adapted to pass a successively printed strip; a punch on one side of said block supported for intermittent movement toward and from said block and having an end face whose cross-sectional size is equal to that of said label; a movably supported slide in contact with the other side of the block and having a label-receiving recess, said slide being disposable at said label forming station so that the recess thereof is alined with said block aperture and being intermittently movable between said label forming station and a label applying station to dispose said recess at each of said stations; said punch being movable into said block aperture to cut a printed portion from said strip, thereby forming a label, and to move said label through said aperture into the alined label-receiving recess of said slide; a plunger movably supported for to and fro movement at said label applying station, a tubular member concentrically disposed around but spaced from said plunger and independently movable longitudinally thereof, said member having a concaved annular recess in the forward edge thereof; said plunger being movable into said slide recess at the label-applying station to engage the label therein and to move said label out of the recess into said flange-enclosed label-receiving area of said spool and in contact with said spool end face, cooperating means on said slide and plunger to permit the slide to be moved past said plunger, said slide being retractable to the label forming station to permit a succeeding label to be received in the recess thereof and to permit said tubular member to move toward said spool end face, the concaved annular recess of said edge of said member being engageable with the annular flange of the spool, thereby to slightly curl the flange to retain the label against displacement from the spool end face, and a plurality of independently movable tubular members disposed laterally of one another and laterally of said first tubular member at said label applying station, means for moving and alining said spool with each of said members, each said member being separately movable to individually engage said spool flange and partially bend the same over onto said peripheral portions of the label.

12. Apparatus of claim 1 wherein said label supporting means are disposed at the peripheral edge of the label, wherein said spool has a second label supporting means engageable with a central aperture in the label, wherein a second forming tool is operatively engageable with said second label supporting means to shape the same into label securing position, and wherein both the forming tool and the second forming tool are heatable.

References Cited in the file of this patent

UNITED STATES PATENTS

| 1,122,280 | Kempshall | Dec. 29, 1914 |
| 1,678,330 | Cylne | July 24, 1928 |
| 1,708,828 | Bremmerman | Apr. 9, 1929 |
| 2,120,901 | Moore | June 14, 1938 |
| 2,209,412 | Lupo | July 30, 1940 |
| 2,287,817 | Murch | June 30, 1942 |
| 2,431,238 | Friedman | Nov. 18, 1947 |
| 2,578,731 | Nordquist et al. | Dec. 18, 1951 |
| 2,588,604 | Archer | Mar. 11, 1952 |
| 2,604,258 | Murnane et al. | July 22, 1952 |
| 2,657,426 | Gora | Nov. 3, 1953 |
| 2,674,009 | Williams | Apr. 6, 1954 |
| 2,688,776 | Evans | Sept. 14, 1954 |